US009404829B1

(12) United States Patent
Tien

(10) Patent No.: US 9,404,829 B1
(45) Date of Patent: Aug. 2, 2016

(54) STETHESCOPE BASED LEAK DETECTION APPARATUS WITH INTERCHANGEABLE HEADS

(71) Applicant: Andrew Tien, Alhambra, CA (US)

(72) Inventor: Andrew Tien, Alhambra, CA (US)

(*) Notice: Subject to any disclaimer, the term of this patent is extended or adjusted under 35 U.S.C. 154(b) by 199 days.

(21) Appl. No.: 14/044,370

(22) Filed: Oct. 2, 2013

(51) Int. Cl.
*G01M 3/24* (2006.01)
*G01M 3/04* (2006.01)

(52) U.S. Cl.
CPC .............. *G01M 3/243* (2013.01); *G01M 3/04* (2013.01)

(58) Field of Classification Search
CPC ......... G01M 3/04; G01M 3/243; G01M 3/24; G01S 1/72; A61B 7/02
USPC .......... 73/40, 40.5 A, 592; 181/131; D24/134
See application file for complete search history.

(56) References Cited

U.S. PATENT DOCUMENTS

| | | | | |
|---|---|---|---|---|
| 1,344,655 | A | * | 6/1920 | Rubin ...................... A61B 7/02 181/137 |
| 1,811,558 | A | | 6/1931 | Porter |
| 2,363,686 | A | * | 11/1944 | Olson ...................... A61B 7/02 181/131 |
| 4,246,776 | A | | 1/1981 | Thompson |
| 4,995,473 | A | * | 2/1991 | Packard ................... A61B 7/02 181/131 |
| 5,675,506 | A | | 10/1997 | Savic |
| 6,438,238 | B1 | * | 8/2002 | Callahan .............. A61B 5/6843 181/131 |
| D479,836 | S | * | 9/2003 | Thornton ..................... D14/228 |
| 7,266,992 | B2 | | 9/2007 | Shamout et al. |
| 2004/0256172 | A1 | * | 12/2004 | Darling .................... A61B 7/02 181/131 |
| 2011/0093220 | A1 | * | 4/2011 | Yang ....................... G01M 3/36 702/51 |
| 2012/0103069 | A1 | | 5/2012 | Al-Qahtani et al. |
| 2014/0309600 | A1 | | 10/2014 | Aceto et al. |
| 2015/0198497 | A1 | * | 7/2015 | Merlob ................... G01M 3/00 73/592 |

FOREIGN PATENT DOCUMENTS

| | | |
|---|---|---|
| JP | 2005283169 A | 10/2005 |
| JP | 2012132847 A | 7/2012 |
| WO | 2013066775 A1 | 5/2013 |

* cited by examiner

*Primary Examiner* — Michael A Lyons
*Assistant Examiner* — David L Singer
(74) *Attorney, Agent, or Firm* — Patent Law & Venture Group; Gene Scott

(57) ABSTRACT

A portable leak detector kit uses a stethoscope-like arrangement including a flexible and shape adjustable tube with several different interchangeable heads mountable at a distal end of the tube for picking up leak sounds of equipment or machinery. A first sound receiving head has a spheroidal shape with an external wire netting while a second head has a surface of spaced apart bumps and apertures and is made of a flexible material enabling it to be wrapped around a pipe, and a plurality of flexible third heads of different sizes enabling them to be selectively clamped around one of a range of NPS size pipes and each having a first open channel in an inside surface. Sound conducting paths join exterior surfaces of the heads to a neck which is ultimately connected through the tube to an ear piece used for listening to the leak sounds.

3 Claims, 1 Drawing Sheet

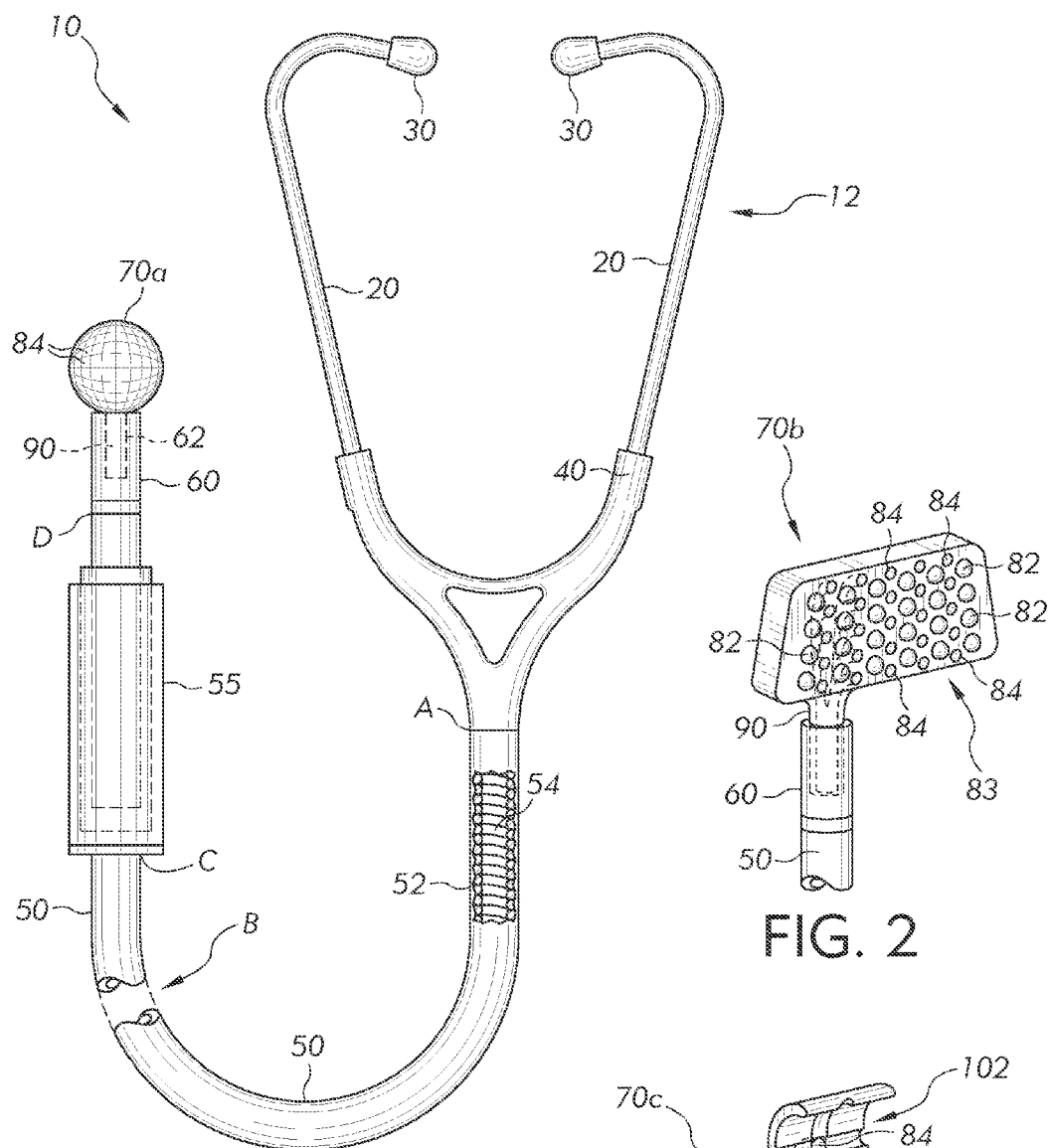
FIG. 1
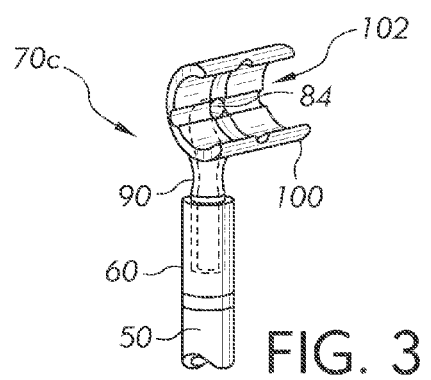
FIG. 2
FIG. 3

STETHESCOPE BASED LEAK DETECTION APPARATUS WITH INTERCHANGEABLE HEADS

BACKGROUND

The field of this disclosure relates to the detection of small gaseous and liquid leaks in equipment and, especially air-conditioning equipment, using an apparatus having means for sound transmission. In determining leaks in equipment, pipe lines, and other sources a number of approaches are in common use. Vacuum leak detection is common and is able to find very small leaks of gases or liquids. Larger leaks are often found by covering the suspected leak joint with a soap solution and looking for air bubbles. This approach is common in determining leaks in automobile tires, but is incapable of detecting small leaks. In large system, acoustic pressure wave leak detection is known but it is not applicable to local leak detection by technicians that may need to find leaks in consumer air conditioners and similar residential or commercial equipment installations. Therefore, there is needed, an easy to use, highly portable, low-cost, and sensitive leak detector apparatus and method for finding relatively small leaks in consumer and commercial air-conditioning equipment and similar types of equipment.

BRIEF DESCRIPTION OF DRAWINGS

FIG. 1 is front elevational view of the apparatus described and shown herein including a first head embodiment;

FIG. 2 is a perspective view of a second head embodiment thereof; and

FIG. 3 is a perspective view of a third head embodiment thereof.

Like reference symbols in the drawing figures indicate like elements.

DETAILED DESCRIPTION

The presently described apparatus is capable of enabling a technician to quickly detect small leaks in processing equipment that have gaseous and liquid fluids which are under an elevated pressure such as air conditioners, compressors, pipe lines and similar equipment.

FIG. 1 shows that the presently described apparatus 10 includes an upper portion 12 having, in one embodiment, a pair of tubes 20 each terminating with an ear piece 30. However, in other embodiments, upper portion 12 may use a single tube instead of two tubes 20 and may have only one ear piece 30. Ear piece 30 may be of the type that covers the ear, or of other common and well known types.

A semi-rigid Y-section 40 maintains the tubes 20 in a spaced apart attitude, as shown, so as to allow the ear pieces 30 to rest comfortably in or around the ears of a technician during use of apparatus 10. Alternately, the Y-section may be any transition between upper portion 12, and a tube 50 as shown in FIG. 1 wherein upper portion 12 and tube 50 are joined at point "A" by a simple friction joint, as is well known in the art, or otherwise. Tube 50 is shown broken away to reveal internal detail. Tube 50 may be constructed using a well-known common flexible metal tube stock 54 covered with a rubber outer layer 52 as shown. Tube 50 is shown broken at point "B" to indicate that tube 50 may be of an indeterminate length and a longer or shorter tube 50 may be used and interchanged, one for another, at points "A" and "C." Tube 50 may join with a telescoping tube section 55 at point "C."

The telescoping section 55 may be made up of two or more coaxial sections capable of sliding, one within the other to extend or contract in length. Such telescoping coaxial sections are known as in automobile whip antennas. Section 55 terminates with a coupler 60 at point "D." Coupler 60 has a receiving hole 62 which is able to frictionally receive a neck 90 which may be a part of each one of interchangeable heads 70a, 70b, and 70c shown respectively in FIGS. 1, 2, and 3. The means for joining neck 90 with coupler 60, and also coupler 60 with telescoping section 55, and section 55 with tube 50, and tube 50 with Y-section 40, and Y-section 40 with ear pieces 20, may be by any means, permanent or non-permanent, as by friction engagement or elastic compression, or otherwise.

As shown in FIG. 1, a first alternate head 70a may be engaged with coupler 60. Head 70a may be of spherical or elongated sphere constructed with external wire netting so as to allow sound to enter and propagate to ear pieces 30. It is possible to use head 70a to scout about within an equipment at flange joints, along conduits and where leaks are known to occur. However, head 70a is not particularly effective in finding small equipment leaks.

As shown in FIG. 2, an alternate head 70b may be used to greater advantage in leak detecting mechanical equipment using sound. Such a head 70b may have a broad or wide surface of bumps 82 on its face 83. Between bumps 82 are small apertures 84 functional as sound inlets which converge on a main channel within coupler 60 through a rigid neck portion 90 of head 70b and may be permanently attached to coupler 60. Head 70b is flexible enough so as to be wrapped around a pipe or a flange or pressed against a curved surface of an equipment where a weld line, for instance, may exist. Placed on the equipment by hand, the head 70b is able to be pressed into intimate contact with each portion of the equipment targeted for leak detection. When in position head 70b may be moved over surfaces of the equipment wherein a small audible sound may be heard at one position of head 70b and by moving it in first one direction and then another, a stronger audible sound may be heard until the source of the leak is discovered. This is possible only because many apertures 84 are present on face 83.

FIG. 3 illustrates a further alternative head 70c which includes a C-clamp portion 100 having one or more open channels 102 on an inside surface of the C-clamp portion 100. When C-clamp portion 100 is snapped around a pipe of compatible diameter, the sound of a leak travels through one or more of open channels 102 to neck portion 90, to coupler 60, and to tube 50. Clearly C-clamp portion 100 of head 70c may be of a particular inside diameter to fit closely around a specific size pipe. Therefore, apparatus 10 may be configured as a kit with several sizes of head 70c and several sizes and flexibilities of head 70b. For instance a kit for pipes may include a head 70c for each of: NPS sizes ⅛ through 3½ (12 heads), another kit for NPS sizes 4 through 9 (7 heads), and a further kit for NPS sizes 10 through 24 (eight heads). In use, head 70c may be snapped onto a pipe of compatible size and then rotated to bring one of the channels 102 into proximity with a leak. Likewise, head 70c may be moved longitudinally along a pipe until finding a leak. When, as often occurs, a leak is at the joint between a pipe proper and a pipe fitting, head 70c is especially efficient in finding the leak when a channel 102 at a side edge of the clamp portion 100 is rotated into proximity of an escaping fluid.

In use apparatus 10 may be worn by placing ear pieces 30 in the ears of a technician, and then selecting and installing a length of tube 50 appropriate for reaching the parts of an equipment to be leak tested. Telescoping section 55 may then be extended so as to reach into parts or areas of the equipment that are not accessible to the technician's hands. One of heads 70a, 70b, or 70c may be engaged with coupler 60 and the selected head may then be directed to those points on the equipment where a leak is suspected. A leak is found by listening to an audible signal that travels from the leak point on the equipment through the head 70a, b, or c, possibly telescoping tube sections 55, tube 50, and Y-section 40.

In conclusion, the present apparatus is a leak detector 10 for use in finding a leak on a surface of a machine (not shown). The detector 10 may have a flexible conduit assembly, which may be made up of conduit portions 20, 40, and 50, in which an impertinently engaged sound receiving head 70a, b, or c may be fastened. The conduit portion 50 may have a shape-and-hold adjustment capacity which means that it may be manually bent into a desired shape for fitting between components of a machine being leak tested, and conveniently re-bent into another shape at-will for fitting between another set of components of the machine, and so on. This adaptability enables the technician to position the head 70a, b, or c into locations on the tested machine that is not otherwise capable of being reached since many spaces do not accommodate a technician's hands due to their size. The head 70a, b, or c having a flexible character, being made of a flexible and elastic material such as a plastic or plastic composite, enables positioning and pressing an exterior surface of the head 70a, b, or c into intimate contact with the leak on the surface of the machine. Apertures 84 or channels 102 are positioned so that the sounds of a leak may be conducted into tube 50, through internal passages within heads 70a, b, or c and there-through to the ear piece 30. The heads 70a, b, or c may be made of a material that provides for a conformable and compressible surface, as for instance with head 70b. The C-shaped head 70c may be included as part of a plurality of C-clamps mutually interchangeable for up picking up leak sounds and conducting them to tube 50.

Embodiments of the subject apparatus and method have been described herein. Nevertheless, it will be understood that modifications may be made without departing from the spirit and understanding of this disclosure. Accordingly, other embodiments and approaches are within the scope of the following claims.

What is claimed is:

1. A portable leak detector kit of mutually joinable elements comprising:
   an upper portion having an upper tube terminating with an ear piece;
   a lower tube of flexible metal tube stock joined with the upper portion;
   a first sound receiving head having a spheroidal shape with an external wire netting and an integral neck;
   a second sound receiving head with an integral neck and having a surface of spaced apart bumps and apertures, wherein said second sound receiving head is of such flexible material as to enable said second sound receiving head to be wrapped around a pipe;
   a plurality of C-shaped third sound receiving heads, each having a neck, and capable of clamping around a range of NPS size pipes, each one of said third sound receiving heads having a first open channel in an inside surface of said third sound receiving head, said open channel extending between opposing sides of said inside surface;
   each one of said first, second and third sound receiving heads having sound conducting paths joining exterior surfaces thereof to said neck wherein said necks are interchangeably engagable with a coupler, wherein said coupler is engagable with said lower tube;
   wherein, said upper portion, said lower tube, said coupler, and one of said first, second, and third sound receiving heads are joined thereby forming a sound conducting path for conducting leak sounds of an equipment to a person's ear.

2. The portable leak detector kit of claim 1 further comprising a telescoping section of said lower tube, said telescoping section made up of two coaxial tube sections capable of sliding, one within the other for extending and contracting in length.

3. The portable leak detector kit of claim 1 wherein said third sound receiving heads each have a second open channel in said inside surface thereof, said second open channel conforming with said C-shaped inside surface and laying orthogonal to said first open channel.

\* \* \* \* \*